Dec. 7, 1965  R. H. THORNER  3,222,046
SPIRAL SPRING CONSTRUCTION FOR SPEED GOVERNORS
Filed Aug. 27, 1962
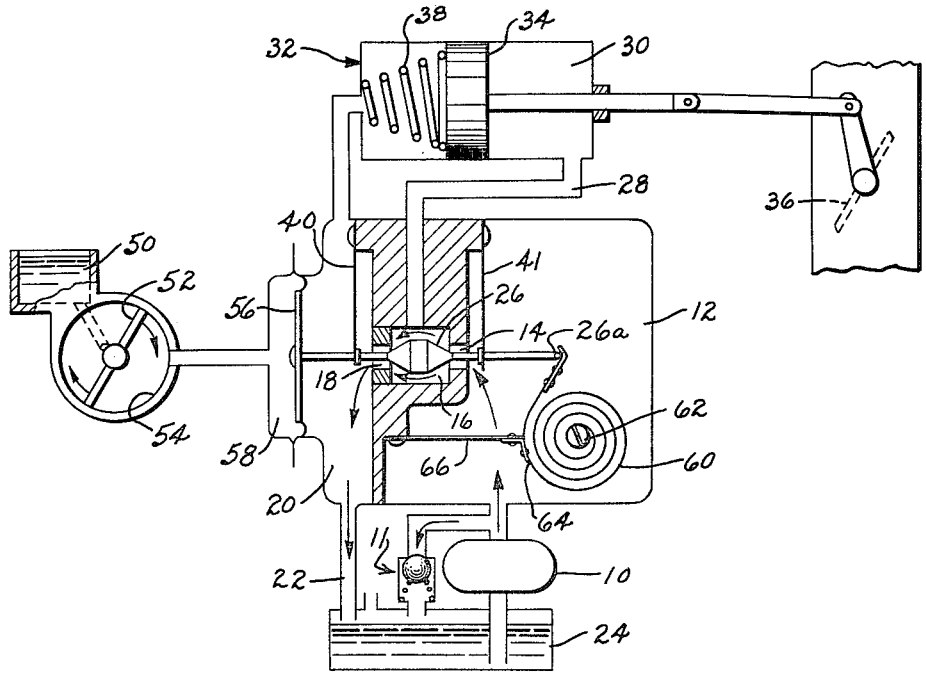
Fig.1.
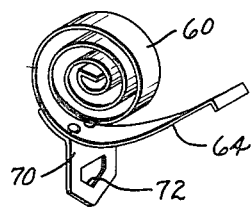
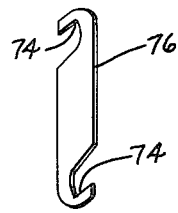
Fig.2.
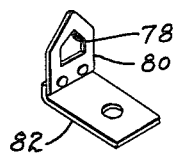
INVENTOR.
ROBERT H. THORNER
BY
ATTORNEYS United States Patent Office 3,222,046
Patented Dec. 7, 1965

3,222,046
SPIRAL SPRING CONSTRUCTION FOR SPEED GOVERNORS
Robert H. Thorner, 19754 Monte Vista, Detroit, Mich.
Filed Aug. 27, 1962, Ser. No. 219,710
7 Claims. (Cl. 267—1)

This application is a continuation-in-part of my co-pending application Serial No. 743,542, filed June 23, 1958, now Patent No. 3,051,139.

This invention relates to a spiral spring construction, per se, which has particular utility (but is not limited thereto) in a speed-governor mechanism as the so-called "speeder spring" therein.

When spiral springs are used in applications where friction is critical, their rotary range of "winding" is limited because the coils touch each other after a relatively short angular travel. Any further angular travel thereafter would no longer be frictionless.

It is a main object of the present invention to provide a novel spiral spring construction in which the angular travel or "winding" of the spring can be substantially increased without the coils contacting each other, thereby retaining its frictionless characteristic. Other objects of the invention will be brought out in the following disclosure.

FIG. 1 shows the spiral spring as it would be used in a speed governor environment; and FIG. 2 is another form of the spiral spring.

In FIG. 1, the frictionless spiral spring is illustrated by way of example in the environment of a speed-governor, in which this spring has particular utility. However, this spiral spring can provide utility in any kind of mechanism in which such frictionless operation is critical and a large range of spring adjustment is desired.

Referring to FIG. 1, a source of energy for the servo-motor is supplied by a pump 10 having a by-pass pressure regulator 11 circulates fluid through chamber 12 (under pressure in this example), through variable inlet orifice 14, chamber 16, outlet orifice 18 through atmospheric chamber 20, through drain passage 22 to a reservoir 24. A pilot means, such as pilot valve 26, varies the apertures oppositely at orifices 14 and 18 to vary the pressure in chamber 16 which is transmitted through passage 28 to chamber 30 of a servo-motor 32. The by-pass regulator 11, or any other suitable pressure regulating means, is provided to supply constant pressure to chamber 12 and particularly at inlet orifice 14. A piston 34 operates a control member 36 in the engine (not shown) for regulating speed. A spring 38 tends to move the control member to reduce speed biased by the fluid pressure in chambers 16 and 30 tending to increase speed. The pilot valve 26 is supported for frictionless movements by swingable leaf spring members 40 and 41, all in a manner shown in my Patent No. 2,737,165, issued March 6, 1956.

Any of my frictionless speed sensing means may be employed to actuate the pilot valve in response to changes in speed, for example as shown in my above-named patent, or in Patent No. 2,808,042. A pressure generator sensor unit of the type shown in FIG. 2 of my Patent No. 2,995,898 is illustrated. In FIG. 1 a reservoir 50 supplies liquid to a vane 52 driven by the engine or vehicle (not shown). The vane rotates in a cylinder 54 to produce a pressure acting on a diaphragm 56 (in chamber 58), which pressure varies as a function of speed.

A spiral or "clock" type speeder spring 60 is secured to and carried by a shaft 62 to act on the pilot valve at a point 26a and bias the force of diaphragm 56. The inner turn of the spiral spring is supported by the slotted shaft 62 rotatable by a convenient knob or lever extending outwardly from the casing (not shown). Counter-clockwise rotation of the shaft, as viewed in FIG. 1, causes the spring to wind and apply a greater leftward force on the pilot valve 26; and clockwise rotation of shaft 62 unwinds the spring which reduces the force applied to the pilot valve. Normally when a spiral spring is "wound," the leftmost (outer) coil 64 is caused to move radially toward the shaft. When the coils touch each other, the spring action is no longer frictionless. A string-like flexible member, such as a leaf spring or music wire piece 66 is secured to this outer coil at one end and to a fixed part of the governor at the other end. This member prevents the outer coil 64 from moving toward the shaft while enabling movements of the end of the spiral spring to accommodate the arcuate movements of the pilot valve as it swings on its leaf springs 40 and 41. With this novel construction the speeder spring 60 can be wound to a much greater range without the coils touching, thereby retaining its frictionless characteristic.

The overall governor operation is as follows, referring to FIG. 1: When the speed increases above the governed value (as determined by the setting of the spiral spring 60 as above discussed), pilot valve 26 moves to the right which reduces the pressure in chambers 16 and 30 so that spring 38 moves control member 36 to return the speed to the governed value. When the speed decreases below the governed value, the reverse action is produced.

FIG. 2 shows a modified form of the clock spring 60, in which a knife-edge link 76 is shown in place of the wire 66 of FIG. 1 to connect a bracket with the clock spring. Any suitable knife-edge link may be used to provide the desired frictionless connection, but in FIG. 2 there is shown by way of example an L-shaped bracket 70 secured to the clock spring and having an aperture with a V-shaped notch 72 adapted to engage a similar V-notch 74 disposed at each end of the link 76. The other end of link 76 is formed to engage a V-notch 78 in an aperture provided in a member 80 suitably secured to a bracket 82 which is secured to the control section, or other fixed support in any suitable manner. The members 70, 76 and 80 are illustrated as made of very thin sheet metal, such as .005–.008″ to provide the desired frictionless knife-edge action. These members may be made of thicker metal if desired, providing suitable knife-edges are ground or otherwise formed at the V-notches 72, 74 and 78. The fixed support 82 may also be mounted above the clock spring 60 with a pair of fingers projecting downwardly, as viewed in FIG. 2, to engage suitable knife-edge connection secured to the lower portion of the outer coil of the clock spring in place of bracket 70. This reversal of the knife-edge construction would not change the inventive concept illustrated in FIGS. 1 and 2 in any way, but is mentioned merely to point out that a compression knife-edge construction may be used equally well as the tension knife-edge construction illustrated in FIGS. 1 and 2.

What I claim is:

1. In a mechanism having an element requiring spring means to produce forces biasing said element, the combination of: means comprising a spiral spring acting on said element to produce said biasing forces, swingable means connected at substantially one end thereof to a portion of said spiral spring and acting in a direction to constrain said portion from moving in a direction opposite to the direction of said biasing force due to the reaction thereof for preventing at least the outer coil of said spiral spring from contacting the other coils thereof as said spring is wound, and said swingable means including means connected at substantially the other end thereof to a fixed support.

2. In a mechanism having an element requiring spring means to produce forces biasing said element, the combination of: means comprising a spiral spring acting on said element to produce said biasing forces, swingable means connected at substantially one end thereof to a portion of said spiral spring and acting in a direction to constrain said portion from moving in a direction opposite to the direction of said biasing force due to the reaction thereof for preventing at least the outer coil of said spiral spring from contacting the other coils as said spring is wound, and said swingable means comprising a wire connected at one end to said portion of said spiral spring and connected at its other end to a fixed support.

3. In a mechanism having an element requiring spring means to produce forces biasing said element, means comprising a spiral spring acting on said element to produce said biasing forces, swingable knife-edge means connected at substantially one end thereof to a portion of said spiral spring and acting in a direction to constrain said portion from moving in a direction opposite to the direction of said biasing force due to the reaction thereof for preventing at least the outer coil of said spiral spring from contacting the other coils thereof as said spring is wound, and said knife-edge means including means connected at substantially the other end thereof to a fixed support.

4. In a mechanism having a movable element requiring means to produce forces biasing said element, the combination of: means comprising a spiral spring acting on said element to produce said biasing forces in one direction, swingable means connected at substantially one end thereof to a portion of said spiral spring and acting to constrain said portion from moving in a direction opposite to said first-named direction of said biasing force due to the reaction thereof, and said swingable means including means connected at substantially its other end thereof to a fixed support.

5. In a mechanism having a movable element requiring means to produce forces biasing said element, the combination of: means comprising a spiral spring acting on said element to produce said biasing forces in one direction, swingable means connected to a portion of said spiral spring and acting to constrain said portion from moving in a direction opposite to said first-named direction of said biasing force due to the reaction thereof, and said swingable means comprising flexible strip means connected at substantially one end thereof to said portion of said spiral spring and connected at substantially its other end to a fixed support.

6. In a mechanism having an element subjected to forces acting thereon in one direction and requiring means to produce opposing forces biasing said element, the combination of: means comprising a spiral spring acting on said element in a direction opposite to said first-named direction to produce said biasing forces, swingable means connected at substantially one end thereof to a portion of said spiral spring and acting thereon to constrain said portion from moving in said first-named direction opposite to the direction of said biasing force due to the reaction thereof for preventing the coils of said spiral spring from contacting each other as said spring is wound through greater angular travel, said swingable means including means connected at substantially the other end thereof to a fixed support, and rotary shaft means to support said spiral spring and to wind same for varying said biasing force.

7. In a mechanism having a movable element requiring means to produce forces biasing said element, the combination of: means comprising a spiral spring acting on said element to produce said biasing forces thereon in one direction, swingable means connected to a portion of said spiral spring and acting to constrain said portion from moving in a direction opposite from said first-named direction of said biasing force due to the reaction thereof for preventing the coils of said spiral spring from contacting each other as said spring is wound through greater angular travel, said swingable means comprising flexible strip means connected at substantially one end thereof to said portion of said spiral spring and connected at its other end to a fixed support for mounting substantially parallel to said direction of movement of said element.

References Cited by the Examiner

UNITED STATES PATENTS

| | | | |
|---|---|---|---|
| 1,231,257 | 6/1917 | Herr | 91—384 |
| 2,627,401 | 2/1953 | Harada | 267—1 |
| 2,737,165 | 3/1956 | Thorner | 123—103 |
| 2,925,066 | 2/1960 | Thorner | 123—103 |
| 2,995,898 | 8/1961 | Thorner | 123—103 |
| 3,051,139 | 8/1962 | Thorner | 91—464 |

SAMUEL LEVINE, *Primary Examiner.*